UNITED STATES PATENT OFFICE.

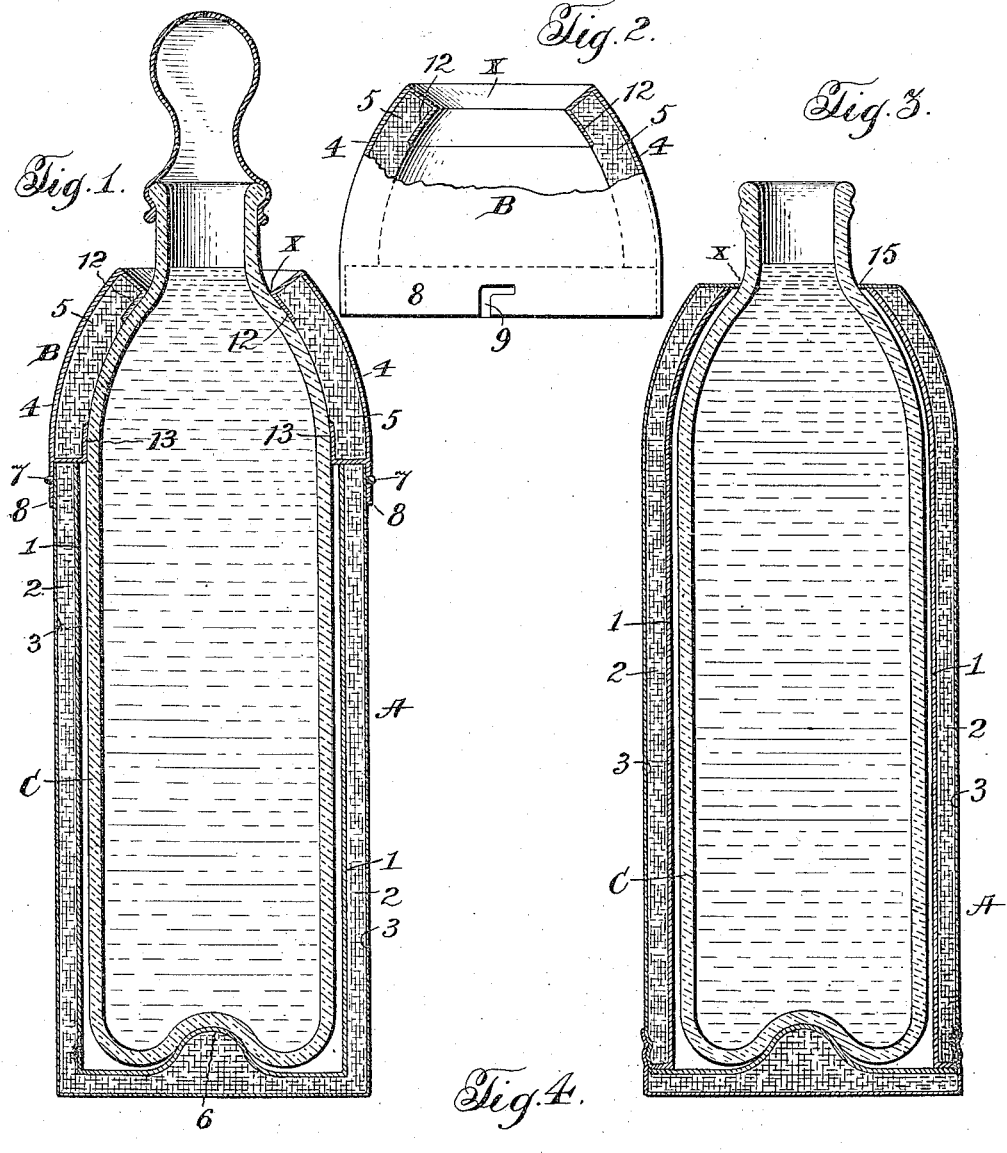

HARLAN J. MAYNARD, OF GREENWICH, CONNECTICUT, ASSIGNOR TO THERMOLAC MANUFACTURING COMPANY, OF BOSTON, MASSACHUSETTS, A CORPORATION OF MASSACHUSETTS.

HOLDER FOR FEEDING OR NURSING BOTTLES.

995,700.  Specification of Letters Patent.  Patented June 20, 1911.

Application filed July 5, 1910. Serial No. 570,420.

*To all whom it may concern:*

Be it known that I, HARLAN J. MAYNARD, a citizen of the United States, and resident of Greenwich, county of Fairfield, State of Connecticut, have invented certain new and useful Improvements in Holders for Feeding or Nursing Bottles, of which the following is a specification.

My invention is a sectional and detachable holder for vessels and particularly for nursing or feeding bottles, in which it is desirable to maintain a liquid at an approximately uniform temperature, either higher or lower than atmospheric temperature for a limited period.

The invention consists in constructing a holder so that it can be readily heated or cooled by means of a suitable liquid, and then applied to the vessel to reinforce the temperature of the latter and tend to preserve it uniform, as fully set forth hereinafter and illustrated in the accompanying drawing, in which—

Figure 1 is a sectional view of my improved holder applied to a nursing bottle; Fig. 2 is a partly sectional view of the cap of the holder; and Figs. 3 and 4 are sectional views illustrating modifications.

The holder has a body A which consists of an inner casing 1, preferably of metal, and a surrounding non-conductor of heat 2, which is preferably within an outer protecting casing 3. The non-conductor may be a layer of felt, paper, pulp, or other covering for the receptacle 1, or it may be a body of air inclosed between the receptacle and the external casing 3 of metal or other material.

At one end of the body is a cap B. As shown in Figs. 1 and 2, the cap is a metallic shell 4 with a flange 8 having L-shaped slots 9 adapted to receive pins or shoulders 7 on the body to form a bayonet joint connection between the cap and body. Within the shell 4 a lining 5 of felt, paper, or other non-conductor of heat is confined by flanges 12, 13.

The interior of the holder conforms generally to the form of the vessel C to be held, and means are provided to center the vessel in the holder so as to be nearly but not quite in contact therewith. As shown in Fig. 1, the vessel is a feeding or nursing bottle and a boss or projection 6 at the bottom of the casing 1 extends into the usual bottom recess of the bottle and centers the body of the bottle in the receptacle, while the lining 5 bears on the tapering neck of the bottle and centers the upper portion of the latter. The neck of the vessel must protrude through the holder and the latter has at one end an opening X for this purpose. In Figs. 1 and 2, this opening is in the cap as shown.

If it is the purpose to maintain the contents of the vessel at a given temperature above atmospheric temperature, the vessel C is withdrawn from the holder A, the latter is filled with a liquid at a temperature slightly above that to be maintained in the vessel, and the latter is filled with the liquid to be held. The contents of the holder are poured out as soon as the holder is properly heated, and the vessel is inserted and secured by the cap. As the contents of the vessel C are withdrawn the entrance of air tends to reduce the temperature of the remaining portion of said contents, but such reduction is prevented by the reinforcing heat of the casing 1, which itself is protected from being rapidly cooled by the external air by the surrounding non-conductor 2. In the case of a feeding or nursing bottle, it has been found that the food will be thus preserved at a proper feeding temperature, throughout the most extended time required for the extraction of the contents of the bottle; a result which it may be remarked, experiments show cannot possibly be obtained by merely covering the bottle with a non-conducting jacket.

If the contents of the vessel are to be maintained for a time at a temperature lower than atmospheric temperature, the holder is first cooled by being filled with a properly cooled liquid, before inserting the vessel containing the liquid to be kept cool.

The cap may be at the bottom of the holder and screw-flanged to screw onto threads at the bottom of the casing as shown in Fig. 3. In this case, the opening X for the neck of the bottle is at the upper end of the casing with a flange 15 for centering the neck of the bottle, and the holder is inverted and a cork or plug inserted in the opening X to permit it to retain the heating or cooling liquid until the holder is at the desired temperature. A non-conducting covering may be applied to the casing 1 without an external casing. Thus in Fig. 4, a covering 2ª of papier mâché is shown, and the exterior of such covering is made watertight so as not to absorb moisture, by a coating 16 of shellac varnish, enamel, etc.

It will be seen that by forming the holder to receive a liquid, the proper temperature may be imparted to it without the use of lamps, electric heaters, etc. which invariably overheat and are otherwise objectionable.

While I have referred to the holder as adapted for use with a feeding or nursing bottle, it is evident that it may be applied to and employed in connection with similar vessels. In some cases the casing 1 may be of china or earthenware and heated oil or solutions may be employed for heating or cooling it. The lining of the holder, to which heat is added or from which heat is extracted, for maintaining the temperature of the inclosed vessel, is preferably of sheet metal, of suitable thickness for storing the desired amount of heat. The air space between the bottle and the holder is important, as it prevents the heat from the lining from being imparted suddenly to the vessel, causing the contents of the vessel to take up the heat about in proportion as they lose heat through the entrance of air to replace the contents of the vessel. The air space also prevents the escape of heat from the vessel through the wall of the holder.

Without limiting myself to the construction shown, I claim:—

1. In a nursing or feeding device, the combination with a bottle, of a temperature maintaining holder therefor, said holder comprising two parts which are interlocked and separable to permit of removal and insertion of the bottle, one of said parts having an opening through which the neck of the bottle protrudes and being constructed to bear on the neck of the bottle and center the bottle in the holder, and the other part having a bearing upon the bottom of the bottle to sustain the bottle in the holder, one of said parts having an inner metal casing larger than the bottle, whereby an air space surrounding the bottle is provided, and a non-conducting covering upon said casing, and the bottle having a neck adapted to project substantially above the upper end of the holder, for the purpose set forth.

2. The combination with a nursing or feeding bottle, of a holder surrounding the bottle and having an opening in its upper end through which the neck of the bottle protrudes, said holder comprising a body A and a cap portion B; the body A comprising an inner metal casing larger than the bottle whereby an air space is produced between the casing and bottle, an outer metal casing, and intermediate non-conducting material; said cap portion comprising a metal shell or casing and an inner layer of non-conducting material adapted to bear upon the neck of the bottle; the said cap and body comprising the holder being provided with interlocking means and adapted to center and clamp the bottle between the cap and the bottom of the body, for the purpose set forth.

In testimony whereof I affix my signature in presence of two witnesses.

HARLAN J. MAYNARD.

Witnesses:
J. A. WATSON,
THOMAS DURANT.

---

Copies of this patent may be obtained for five cents each, by addressing the "Commissioner of Patents, Washington, D. C."